United States Patent
Kim et al.

(10) Patent No.: US 9,425,477 B2
(45) Date of Patent: Aug. 23, 2016

(54) FUEL CELL STACK

(71) Applicant: Hyundai Motor Company, Seoul (KR)

(72) Inventors: Duck Whan Kim, Seoul (KR); Young Bum Kum, Seoul (KR); Jung Do Suh, Seoul (KR); Yong Suk Heo, Seoul (KR); Jung Han Yu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 14/458,755

(22) Filed: Aug. 13, 2014

(65) Prior Publication Data

US 2015/0188180 A1    Jul. 2, 2015

(30) Foreign Application Priority Data

Dec. 30, 2013   (KR) .................. 10-2013-0167271

(51) Int. Cl.
  *H01M 8/02*   (2016.01)
  *H01M 8/24*   (2016.01)

(52) U.S. Cl.
  CPC ............ *H01M 8/2475* (2013.01); *H01M 8/248* (2013.01); *H01M 2250/20* (2013.01); *Y02E 60/50* (2013.01); *Y02T 90/32* (2013.01)

(58) Field of Classification Search
  None
  See application file for complete search history.

(56) References Cited

U.S. PATENT DOCUMENTS

| | | | |
|---|---|---|---|
| 2008/0182151 A1* | 7/2008 | Mizusaki et al. | 429/34 |
| 2010/0098978 A1* | 4/2010 | Hafemeister et al. | 429/19 |
| 2013/0273452 A1* | 10/2013 | Barton | 429/469 |

FOREIGN PATENT DOCUMENTS

| | | |
|---|---|---|
| JP | 2012-181996 A | 9/2012 |
| KR | 10-2007-0059648 A | 6/2007 |
| KR | 10-0873238 B1 | 12/2008 |
| KR | 10-2009-0115476 | 11/2009 |
| KR | 10-2011-0003912 | 1/2011 |
| KR | 10-2012-0046658 | 5/2012 |
| WO | 2008/113326 A2 | 9/2008 |

* cited by examiner

*Primary Examiner* — Cynthia K Walls
(74) *Attorney, Agent, or Firm* — Mintz Levin Cohn Ferris Glovsky and Popeo, P.C.; Peter F. Corless

(57) ABSTRACT

A fuel cell stack is provided that includes a fuel cell stack module and an enclosure. The fuel cell stack module includes end plates and coupling bars coupled to the end plates. The enclosure includes an upper enclosure covering a front surface, an upper surface, and a back surface of the fuel cell stack module, a lower enclosure covering the front surface, a lower surface, and the back surface of the fuel stack module, a left enclosure fixed to one of the end plates, and a right enclosure fixed to the other of the end plates. The upper enclosure and the lower enclosure are coupled to protruding portions of the left enclosure and the right enclosure and bent toward the surfaces of the fuel cell stack module so as to be in surface contact with the surfaces of the fuel cell stack module.

16 Claims, 7 Drawing Sheets

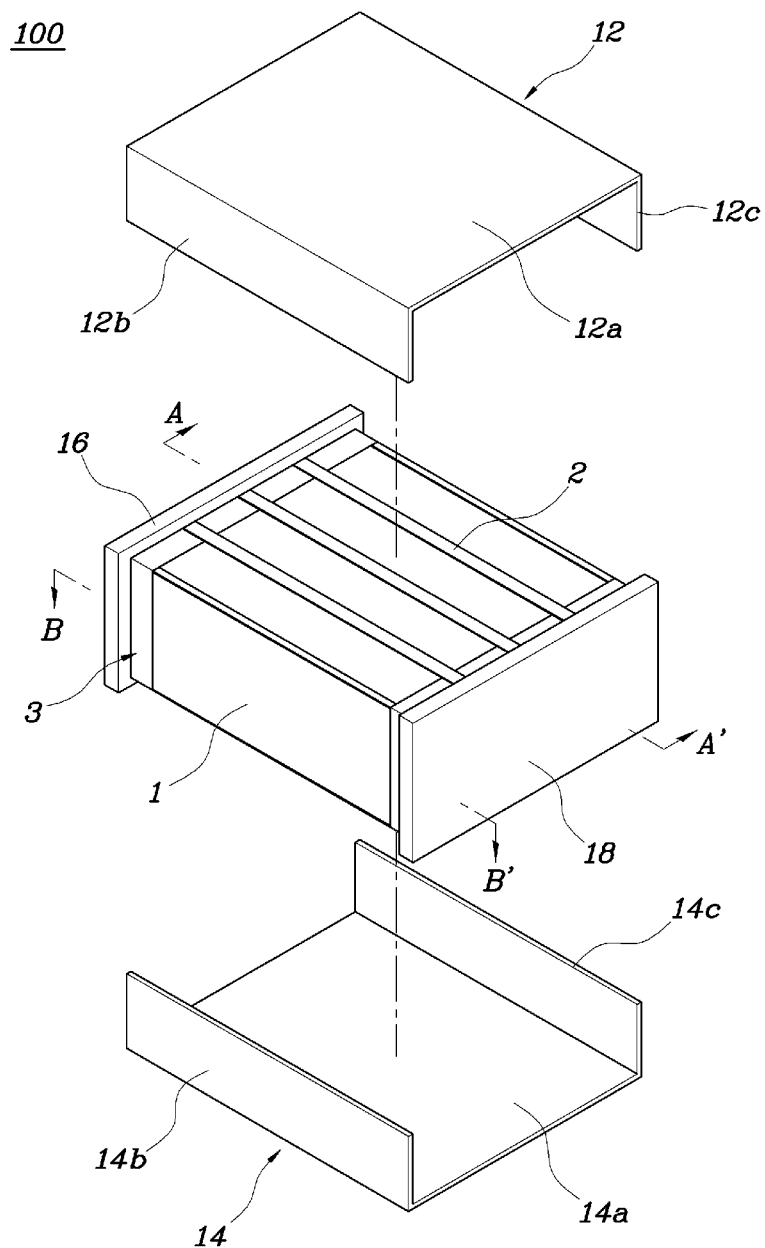

FUEL CELL STACK

CROSS REFERENCE TO RELATED APPLICATION

The present application claims priority to Korean Patent Application No. 10-2013-0167271, filed on Dec. 30, 2013, the entire contents of which is incorporated herein for all purposes by this reference.

BACKGROUND OF THE INVENTION

1. Field of the Invention

The present invention relates to a fuel cell stack, and more particularly, to a fuel cell stack which can prevent a fuel cell stack module from being deformed at the time of a car accident.

2. Description of the Related Art

A Polymer Electrolyte Membrane Fuel Cell (PEMFC) or a Proton Exchange Membrane Fuel Cell refers to a device which produces electricity and water through an electrochemical reaction between hydrogen with oxygen. It has advantages of high power generation efficiency, high current density, high output power density, short starting time, and fast response to change in load, compared to other types of fuel cells.

A general fuel cell stack has a Membrane-Electrode Assembly (MEA) which includes a solid polymer electrolyte membrane which allows migration of hydrogen ions therethrough, and electrode layers (i.e. anode and cathode), disposed on both opposite principal surfaces of the solid polymer electrolyte membrane and coated with a catalyst which promotes a reaction between hydrogen and oxygen.

On the outer surface of each electrode layer, i.e. anode or cathode, a Gas Diffusion Layer (GDL) and a gasket layer are stacked in that order. The outer surfaces of the GDLs are provided with separators with flow fields which act as channels for reaction gases (i.e. hydrogen serving as fuel and air with oxygen serving as oxidant) and for coolant. End plates for supporting each component are combined with the outermost components to provide a compact structure.

FIG. 1 is a perspective view which schematically illustrates a fuel cell stack according to a conventional art. A fuel cell stack module 1 according to the conventional art typically includes 200 to 400 fuel cells. In order to obtain a fuel cell stack module 1 made up of a plurality of fuel cells, end plates 3 are placed on both opposite side surfaces of a stack of fuel cells, pressed up to a necessary pressure, and coupled to the stack of fuel cells using coupling bars 2. The stack of fuel cells disposed between the two end plates 3 are assembled into a single body by coupling respective ends of the coupling bars 2 to the end plates 3 using bolts.

The method of using the coupling bars 2 to assemble the fuel cell stack module 1 has an advantage that a sufficient surface pressure can be applied to the fuel cell stack module 1 and the volume of the fuel cell stack module 1 can be reduced. However, the fuel cell stack module 1 assembled using this method is vulnerable to bending and twisting in X and Z directions in an accident. FIGS. 2A to 2C show such bending and twisting motions in Z and X directions after an accident.

In FIGS. 2A-2C, the fuel cell stack module 1 which is assembled using the coupling bars 2 is deformed and is likely to malfunction when receiving an impact. This can result in a short-circuit within the fuel cell stack module 1, resulting in fire. As such, there is a need for a structure which can prevent damage to the fuel cell in the event of an impact.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a fuel cell stack which can prevent a fuel cell stack module from being deformed when an impact is applied to a fuel cell vehicle.

According to one aspect, there is provided a fuel cell stack including: a fuel cell stack module having end plates coupled to opposite side surfaces of a stack of fuel cells, respectively, and coupling bars coupled to the end plates; and an enclosure including an upper enclosure covering a portion of a front surface, an upper surface, and a portion of the back surface of the fuel cell stack module, a lower enclosure covering a portion of the front surface, a lower surface, and a portion of the back surface of the fuel stack module, a left enclosure fixed to one of the end plates, and a right enclosure fixed to the other one of the end plates, wherein the upper enclosure and the lower enclosure are coupled to protruding portions of the left enclosure and the right enclosure, which protrude forwards and backwards at side ends of each of the front and back surfaces of the fuel cell stack module. More specifically, the upper enclosure and the lower enclosure are bent toward the surfaces of the fuel cell stack module from the protruding portions so as to be in surface contact with the surfaces of the fuel cell stack module.

Furthermore, at least a portion of an upper surface of the upper enclosure may be in surface contact with the upper surface of the fuel cell stack module. The portion of the upper surface of the upper enclosure which is in contact with the upper surface of the fuel stack module may be a corner portion between the front surface and the upper surface of the fuel cell stack module.

At least a portion of a lower surface of the lower enclosure may be in surface contact with the lower surface of the fuel cell stack.

The portion of the lower surface of the lower enclosure which is in contact with the lower surface of the fuel stack may be a corner portion between the front surface and the lower surface of the fuel cell stack module.

A corner portion between a front surface or back surface and an upper surface of the upper enclosure may be in surface contact with a corner portion between the front surface or back surface and the upper surface of the fuel cell stack module.

A corner portion between a front surface or back surface and a lower surface of the lower enclosure may be in surface contact with a corner portion between the front surface or back surface and the lower surface of the fuel cell stack. The left enclosure may be integrated with one of the end plates and the right enclosure may be integrated with the other of the end plates.

According to another aspect, there is provided a fuel cell stack including: a fuel stack module including end plates coupled to opposite two side surfaces of a stack of fuel cells and coupling bars coupled to the end plates; and an enclosure including an upper enclosure covering a portion of a front surface, an upper surface, and a portion of a back surface of the fuel cell stack module, a lower enclosure covering a portion of the front surface, a lower surface, and a portion of the back surface of the fuel cell stack, a left enclosure fixed to one of the end plates, and a right enclosure fixed to the other of the end plates. The upper enclosure and the lower enclosure may be bent from the end plates toward surfaces of the fuel cell stack module in a manner of conforming to step portions formed by the stack of fuel cells and the end plates of the fuel cell stack module so that the upper enclosure and the lower enclosure are in surface contact with at least part of the fuel cell stack module.

A fuel cell stack according to exemplary embodiment includes an enclosure which is able to prevent deformation of the fuel cell structure during an impact, particularly in a fuel cell vehicle, due to the enhanced rigidity of the structure.

BRIEF DESCRIPTION OF THE DRAWINGS

The above and other objects, features and other advantages of the present invention will be more clearly understood from the following detailed description when taken in conjunction with the accompanying drawings, in which:

FIG. 3 is an exploded perspective view illustrating a fuel cell stack according to one exemplary embodiment of the present invention;

DETAILED DESCRIPTION OF THE INVENTION

Figure 1:
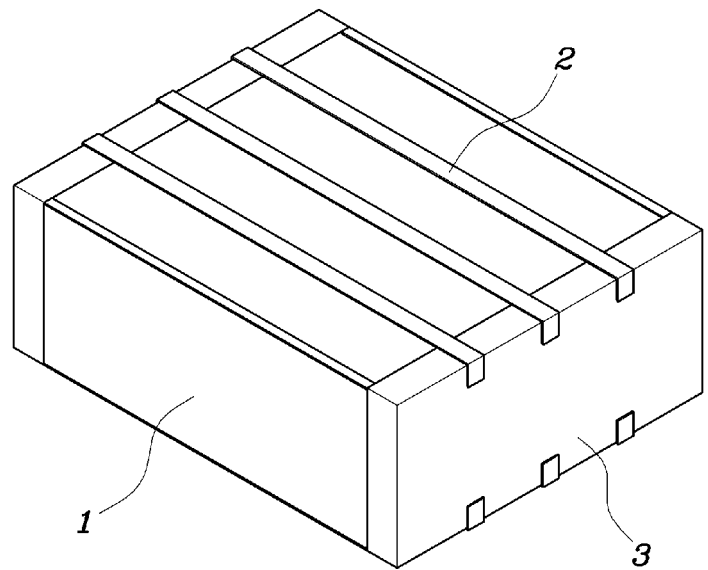
FIG. 1 is a perspective view which schematically illustrates a fuel cell stack module according to a conventional art.
Figure 2A:
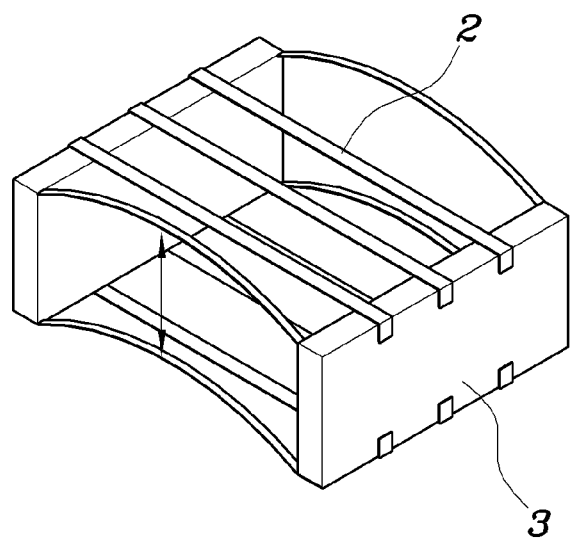
FIGS. 2A to 2C are perspective views illustrating bending and twisting of a fuel cell stack when the fuel cell stack is assembled using coupling bars.
Figure 2B:
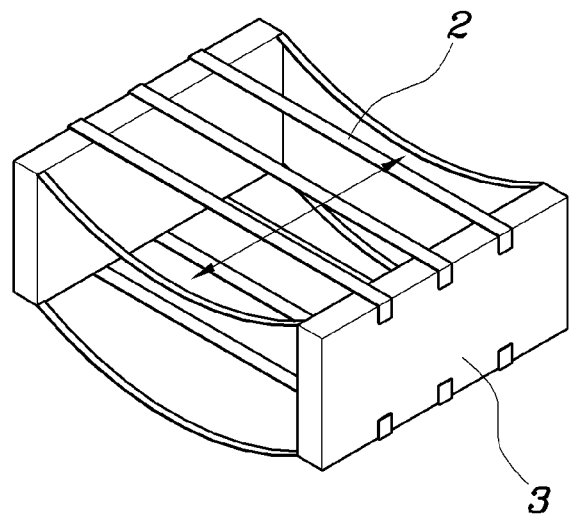
Figure 2C:
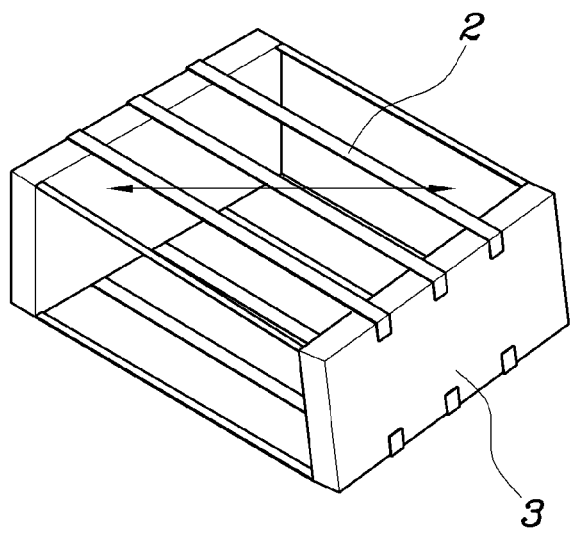

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

FIG. 3 is an exploded perspective view which schematically illustrates a fuel cell stack according to one embodiment of the present invention. A fuel cell stack module 1 according to one exemplary embodiment of the present invention has a multilayer structure made up of an MEA, GDLs, and separators which are sequentially stacked. End plates 3 are disposed on two opposite side surfaces of the fuel cell stack module 1. Coupling bars 2 are coupled to the end plates.

In particular, the fuel cell stack 100 includes the fuel cell stack module 1, and an enclosure (made up of 12, 14, 16 and 18) which covers the surfaces of the fuel cell stack module 1. The enclosure includes an upper enclosure 12, a surface lower enclosure 14, a left surface enclosure 16, and a right enclosure 18. The left enclosure 16 and the right enclosure 18 may be integrated with the two end plates 3, respectively.

In particular, upper enclosure 12 covers the front surface, the back surface, and the upper surface of the fuel cell stack module 1, and the lower enclosure covers the front surface, the back surface, and the lower surface of the fuel cell stack module 1. To be specific, the upper enclosure 12 includes a front surface part 12b which covers a portion of the front surface of the fuel cell stack module 1, a back surface part 12c which covers a portion of the back surface of the fuel cells tack module 1, and an upper surface part 12a which covers the upper surface of the fuel cells tack module 1. The lower enclosure 14 includes a front surface part 14b which covers a portion of the front surface of the fuel cell stack module 1, a back surface part 14b which covers a portion of the back surface of the fuel cells tack module 1, and a lower surface part 14c which covers the lower surface of the fuel cells tack module 1. The front surface of the fuel cells tack module 1 is covered by the front part 12b of the upper enclosure 12 and the front surface part 14b of the lower enclosure 14. A combination of the front surface part 12b of the upper enclosure 12 and the front surface part 14b of the lower enclosure 14 may be referred to as a front enclosure 13. The back surface of the fuel cells tack module 1 is covered by the back surface part 12c of the upper enclosure 12 and the back surface part 14c of the lower enclosure 14. A combination of the back surface part 12c of the upper enclosure 12 and the back surface part 14c of the lower enclosure 14 may be referred to as a back enclosure 15.

Figure 4:
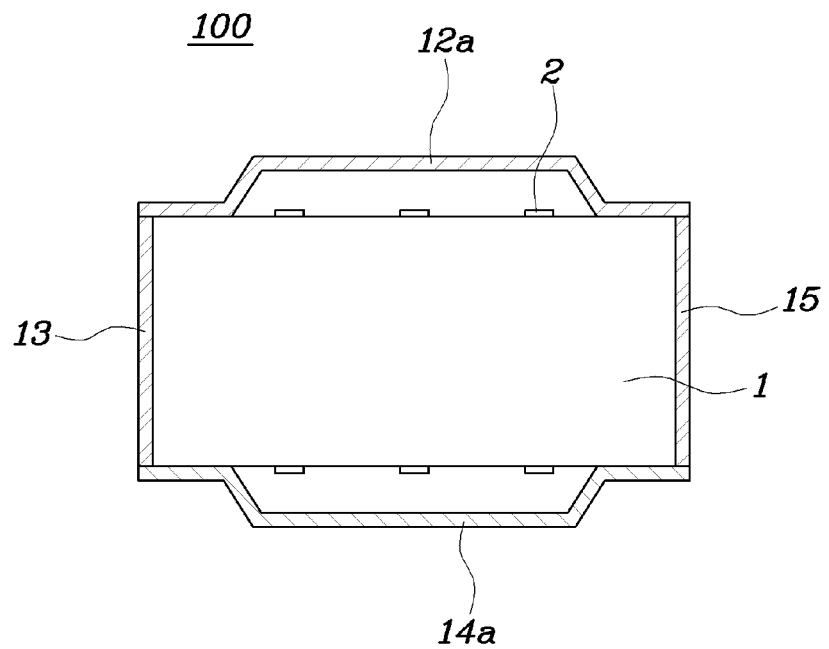
FIG. 4 is a cross-sectional view illustrating the fuel cell stack according to one exemplary embodiment of the present invention.
Figure 5A:
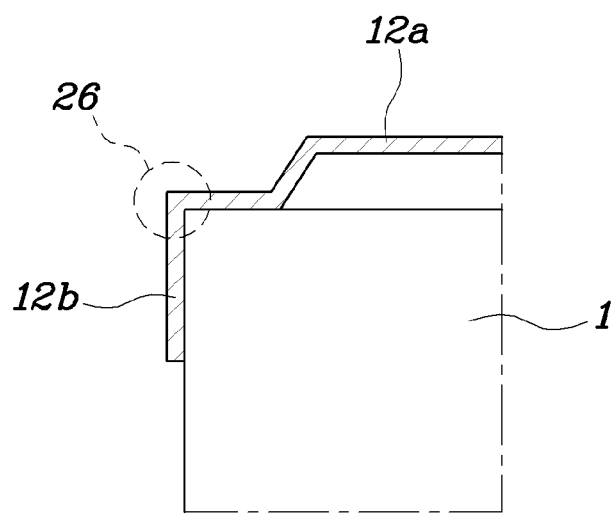
FIGS. 5A and 5B are cross-sectional views which illustrate a portion of the fuel cell stack illustrated in FIG. 4.
Figure 5B:
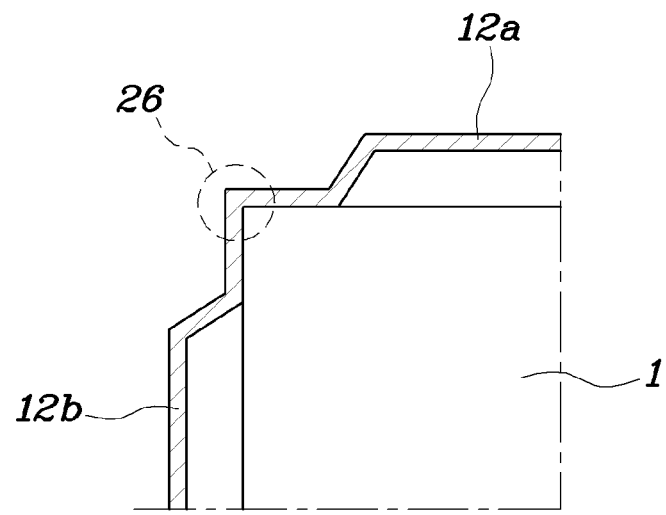

FIG. 4 is a cross-sectional view of the fuel cell stack 100 according to one embodiment of the present invention. FIGS. 5A and 5B are cross-sectional views which illustrate a portion of the fuel cell stack 100 illustrated in FIG. 4. With reference to FIGS. 4, 5A and 5B, FIG. 4 illustrates a state when at least a portion of the upper surface part 12a of the upper enclosure 12 may be in surface contact with the upper surface of the stack cell module 1, FIG. 5A illustrates a corner portion 26 illustrated in FIG. 4 in an enlarged manner, and FIG. 5B illustrates a state when a portion of the upper surface part 12a of the upper enclosure 12 and at least a portion of the front surface part 12b of the upper enclosure 12 may be in surface contact with the upper surface and the front surface of the fuel cell stack module 1, respectively. In the example illustrated in FIGS. 4 to 5B, the portion of the upper surface part 12a of the upper enclosure 12 which may be in surface contact with the upper surface of the fuel cell stack module 1, and the portion of the front surface part 12b of the upper enclosure 12 which may be in surface contact with the front surface of the fuel cell stack module 1 may be a corner portion 26 between the front surface and the upper surface of the fuel cell stack 1.

This positional relationship may also be applied to between the upper surface part 12a and the back surface part 12c of the upper enclosure 12, between the lower surface part 14a and the front surface part 14b of the lower enclosure 14, and between the lower surface part 14a and the back surface part 14b of the lower enclosure 14. This corner portion between the front surface or back surface and the upper surface of the fuel cell stack module 1 may be in surface contact with the corner portion 26 between the front surface part 12b or back surface part 12c and the upper surface part 12a of the upper enclosure 12. The corner portion between the front surface or back surface and the lower surface of the fuel cell stack 1 may be in surface contact with the corner portion 26 between the front surface part 14b or back surface part 14c and the lower surface part 14a of the lower enclosure 14.

Figure 6A:
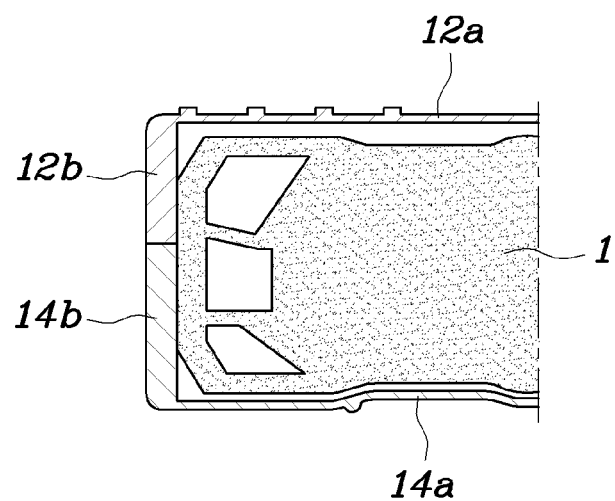
FIGS. 6A and 6B are cross-sectional views of the fuel cell stack which are taken along a line A-A' illustrated in FIG. 3, and FIGS. 6C and 6D are cross-sectional views of the fuel cell stack which are taken along a line B-B' illustrated in FIG. 3.
Figure 6B:
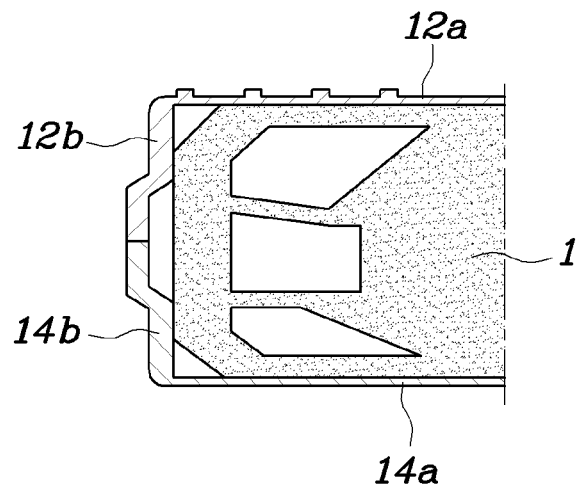
Figure 6C:
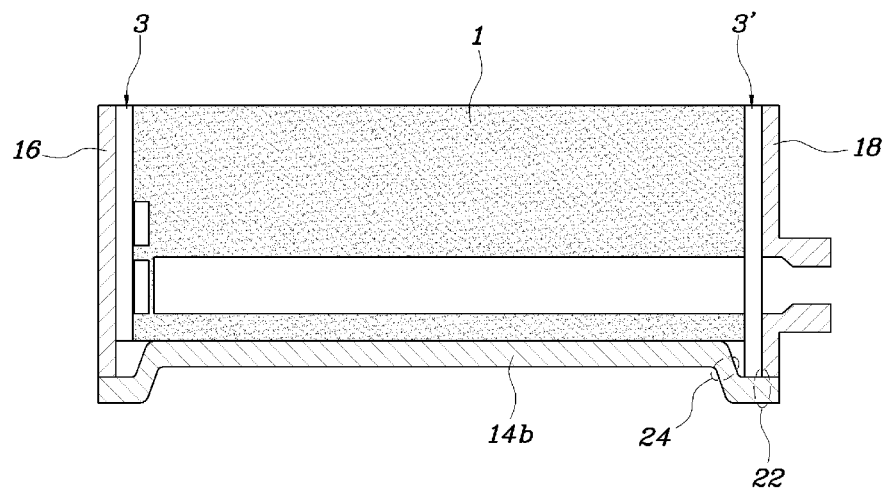
Figure 6D:
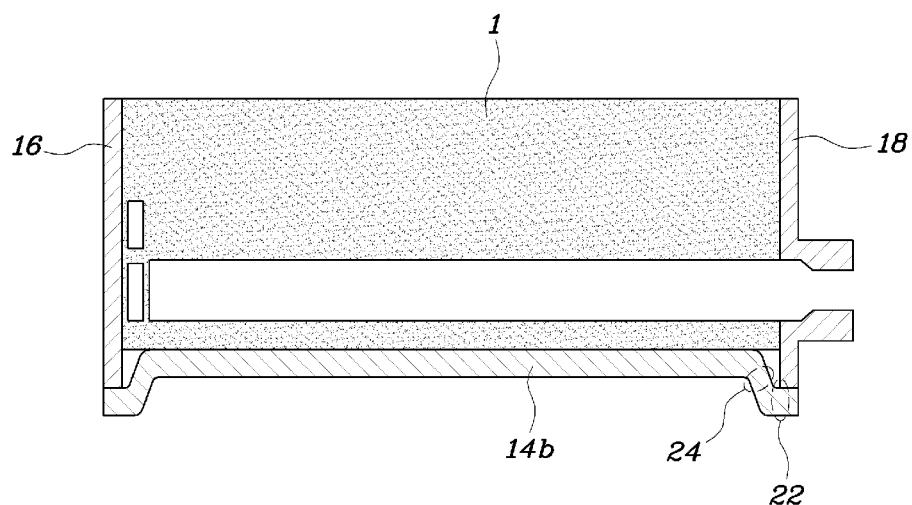

FIGS. 6A to 6B are cross-sectional views of the fuel cell stack 100, taken along a line A-A' illustrated in FIG. 3, and FIGS. 6C to 6D are cross-sectional views of the fuel cell stack 100, taken along a line B-B'. The end plates 3 are attached to the two opposite side surfaces of the fuel cell stack module 1. The left enclosure 16 and the right enclosure 18 may be integrated with the end plates 3, respectively.

The fuel cell stack module 1 needs to be connected to an interface for supply of reaction gases. The interface may be connected to the two opposite side surfaces or one side surface of the fuel cell stack module 1. For this connection, the end plates 3 protrude from the front and back surfaces of the fuel cell stack module 1, forming protruding portions or step portions.

As such, the upper enclosure 12 and the lower enclosure 14 may be combined with the protruding portions 22 and extend inward in the fuel cell stack module 1. The upper enclosure 12 and the lower enclosure 14 may be formed to secure the surface contact with the fuel cell stack module 1. That is, the end plates 3 or the left and right enclosures 16 and 18 may be combined with the respective side ends of each of the front surface parts 12b and 14b of the upper enclosure 12 and lower enclosure 14.

FIG. 6C illustrates the example in which the end plates 3 and the left and right enclosures 16 and 16 are separately constructed. FIG. 6D illustrates the example in which the end plates 3 and the left and right enclosures 16 and 18 are integrated with each other.

When the front surface parts 12b and 14b of the upper enclosure 12 and lower enclosure 14 are flat in the state where the upper enclosure 12 and lower enclosure 14 are combined with the left enclosure 16 and right enclosure 18, deformation of the fuel cell stack module 1 cannot be prevented at the time of a car accident. Accordingly, as illustrated in FIG. 6C, the side ends of the front surface parts 12b and 14b of the upper enclosure 12 and lower enclosure 14 are combined with the left and right enclosures 16 and 18, and are bent toward the fuel cell stack module 1 so that they can be in surface contact with the fuel cell stack 1. As can be seen, the back surface parts 12c and 14c of the upper enclosure 12 and lower enclosure 14 have the same structure.

That is, the front surface parts 12a and 14a and the back surface parts 12c and 14c may be bent inward (i.e. toward the front surface and back surface of the fuel cell stack module 1) from the protruding portions or step portions 22 so as to be partially in surface contact with the fuel cell stack module 1. Since FIG. 6A is a cross-sectional view taken along the line A-A' in FIG. 3, it is not irrelevant to the shape of the protruding portions or step portions 22. That is, FIG. 6A illustrates a center portion of the fuel cell stack module 1 and a connection structure of the upper enclosure 12 and lower enclosure 14. As illustrated in FIGS. 6A and 6B, at least parts of the front surface part 12b and 14b of the upper enclosure 12 and lower enclosure 14 are in surface contact with the fuel cell stack module 1, in positions other than the corner portions of the fuel cell stack module 1.

That is, as illustrated in FIG. 6A, the entire front surface of the fuel cell stack module 1 except for the corner portion are in surface contact with the front surface parts 12b and 14b of the upper enclosure 12 and lower enclosure 14. Furthermore, as illustrated in FIG. 6B, some portions of the front surface parts 12b and 14b of the upper enclosure 12 and lower enclosure 14 besides the corner portions may be separated from the front surface of the fuel cell stack module 1.

Since the fuel cell stack module 1 is supported or fixed using this structure, it is possible to prevent the fuel cell stack module 1 from being deformed during an impact.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A fuel cell stack comprising:
   a fuel cell stack module including end plates coupled to opposite side surfaces of a stack of fuel cells, respectively, and coupling bars coupled to the end plates; and
   an enclosure including
      an upper enclosure covering a portion of a front surface, an upper surface, and a portion of the back surface of the fuel cell stack module,
      a lower enclosure covering a portion of the front surface, a lower surface, and a portion of the back surface of the fuel stack module, a left enclosure fixed to one of the end plates, and
a right enclosure fixed to the other one of the end plates,
wherein each of the upper enclosure and the lower enclosure are coupled to protruding portions of both the left enclosure and the right enclosure, wherein the protruding portions protrude forwards and backwards at side ends of each of a front and a back surface of the fuel cell stack module, and
wherein the upper enclosure and the lower enclosure are bent toward surfaces of the fuel cell stack module from the protruding portions and are in surface contact with the surfaces of the fuel cell stack module.

2. The fuel cell stack according to claim 1,
wherein at least a portion of an upper surface of the upper enclosure is in surface contact with the upper surface of the fuel cell stack module.

3. The fuel cell stack according to claim 2,
wherein the portion of the upper surface of the upper enclosure which is in contact with the upper surface of the fuel stack module is a corner portion between the front surface and the upper surface of the fuel cell stack module.

4. The fuel cell stack according to claim 1,
wherein at least a portion of a lower surface of the lower enclosure is in surface contact with the lower surface of the fuel cell stack.

5. The fuel cell stack according to claim 4,
wherein the portion of the lower surface of the lower enclosure which is in contact with the lower surface of the fuel stack is a corner portion between the front surface and the lower surface of the fuel cell stack module.

6. The fuel cell stack according to claim 1,
wherein a corner portion between a front surface or back surface and an upper surface of the upper enclosure is in surface contact with a corner portion between the front surface or back surface and the upper surface of the fuel cell stack module.

7. The fuel cell stack according to claim 1,
wherein a corner portion between a front surface or back surface and a lower surface of the lower enclosure is in surface contact with a corner portion between the front surface or back surface and the lower surface of the fuel cell stack.

8. The fuel cell stack according to claim 1,
wherein the left enclosure is integrated with a first end plate and the right enclosure is integrated with a second end plate.

9. A fuel cell stack comprising:
a fuel stack module including end plates coupled to opposite two side surfaces of a stack of fuel cells and coupling bars coupled to the end plates; and
an enclosure including:
an upper enclosure covering a portion of a front surface, an upper surface, and a portion of a back surface of the fuel cell stack module,
a lower enclosure covering a portion of the front surface, a lower surface, and a portion of the back surface of the fuel cell stack,
a left enclosure fixed to one of the end plates, and
a right enclosure fixed to the other of the end plates,
wherein the upper enclosure and the lower enclosure are bent from the end plates toward surfaces of the fuel cell stack module in a manner of conforming to step portions formed by the stack of fuel cells and the end plates of the fuel cell stack module so that the upper enclosure and the lower enclosure are in surface contact with at least part of the fuel cell stack module.

10. The fuel cell stack according to claim 9,
wherein at least a portion of an upper surface of the upper enclosure is in surface contact with the upper surface of the fuel cell stack module.

11. The fuel cell stack according to claim 10,
wherein the portion of the upper surface of the upper enclosure which is in contact with the upper surface of the fuel stack module is a corner portion between the front surface and the upper surface of the fuel cell stack module.

12. The fuel cell stack according to claim 9,
wherein at least a portion of a lower surface of the lower enclosure is in surface contact with the lower surface of the fuel cell stack.

13. The fuel cell stack according to claim 12,
wherein the portion of the lower surface of the lower enclosure which is in contact with the lower surface of the fuel stack is a corner portion between the front surface and the lower surface of the fuel cell stack module.

14. The fuel cell stack according to claim 9,
wherein a corner portion between a front surface or back surface and an upper surface of the upper enclosure is in surface contact with a corner portion between the front surface or back surface and the upper surface of the fuel cell stack module.

15. The fuel cell stack according to claim 9,
wherein a corner portion between a front surface or back surface and a lower surface of the lower enclosure is in surface contact with a corner portion between the front surface or back surface and the lower surface of the fuel cell stack.

16. The fuel cell stack according to claim 9,
wherein the left enclosure is integrated with a first end plate and the right enclosure is integrated with a second end plate.

* * * * *